United States Patent
Chen

(10) Patent No.: US 7,298,894 B2
(45) Date of Patent: Nov. 20, 2007

(54) COLOR IMAGE CONVERSION METHOD AND SYSTEM FOR REDUCING COLOR IMAGE DATA SIZE

(75) Inventor: Guo-Tai Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 767 days.

(21) Appl. No.: 10/463,334

(22) Filed: Jun. 18, 2003

(65) Prior Publication Data

US 2004/0258298 A1    Dec. 23, 2004

(51) Int. Cl.
*G06K 9/00*    (2006.01)
*H04N 1/56*    (2006.01)

(52) U.S. Cl. .................................... 382/167

(58) Field of Classification Search ............... 382/162, 382/166, 167, 172, 218, 219, 305; 345/589, 345/592, 600–604; 358/515, 518; 375/240.25; 348/143
See application file for complete search history.

(56) References Cited

U.S. PATENT DOCUMENTS

| | | | | |
|---|---|---|---|---|
| 4,706,111 A | * | 11/1987 | Abe et al. .................. | 348/617 |
| 5,130,786 A | * | 7/1992 | Murata et al. ......... | 375/240.25 |
| 5,552,904 A | * | 9/1996 | Ryoo et al. ................ | 358/518 |
| 6,172,768 B1 | * | 1/2001 | Yamada et al. ............. | 358/1.9 |
| 6,421,146 B1 | * | 7/2002 | Yoo .......................... | 358/461 |
| 6,836,568 B1 | * | 12/2004 | Morishita ................... | 382/219 |
| 2003/0021470 A1 | * | 1/2003 | Kakutani .................... | 382/162 |
| 2004/0109059 A1 | * | 6/2004 | Kawakita .................... | 348/143 |
| 2004/0258298 A1 | * | 12/2004 | Chen .......................... | 382/162 |
| 2005/0219569 A1 | * | 10/2005 | Yamamoto et al. .......... | 358/1.9 |

* cited by examiner

*Primary Examiner*—Amir Alavi
(74) *Attorney, Agent, or Firm*—Rabin & Berdo, P.C.

(57) ABSTRACT

A color image conversion method and the associated system are disclosed. An allowed error range of pixels is determined. After an image input device reads a document, the pixel information and the pixel allowed error range are compared to determine whether the document is a color or black-and-white (BW) one. If it is a BW document, the image file is directly converted into a monochromic and grey-level one and stored in 8-bit or even 1-bit format, thereby reducing the storage space occupied by the image file.

12 Claims, 2 Drawing Sheets

COLOR IMAGE CONVERSION METHOD AND SYSTEM FOR REDUCING COLOR IMAGE DATA SIZE

FIELD OF INVENTION

The invention relates to a method and system for reducing image data sizes and, in particular, to a method and system that utilizes color image conversions to reduce image data sizes.

RELATED ART

The pictures and image files used in computers or digital audio-video (AV) products use the RGB (red-green-blue) mode to represent colors. Three numbers are employed to represent components of the three primitive colors. A pixel is normally coded by 24 bits. Suppose the numerical range is between 0 and 255, then each primitive color can have 256 different strengths. The color in each pixel is a mixture of he three primitive colors. Therefore, the RGB combinations can give 256×256×256=16,777,216 different colors.

Since the numerical value of each primitive color is stored in one byte and the color information contains three numbers, each pixel therefore is represented by three bytes (24 bits). The so-called 24-bit, 16-bit and 8-bit display modes mean how many bits are used to store color information in a pixel. Consequently, more colors can be formed if more bits are used. However, human eyes cannot distinguish to close-by colors among 16 million different colors. Moreover, detailed color information for an image often requires a large portion of memory space. This causes difficulties in file transmissions and storage.

To solve the problems of slow display speeds and inconvenience in carriage for huge-size images, many methods have been proposed to reduce the image data. For example, image compression is one solution. The image compression generates another set of data from the original image data. The newly generated data is the compression result. The memory occupied by the compression result is usually much less than the original image file. The compression result provided by some file formats can be restored. The original image can be recovered using appropriate decompression methods.

There are currently many compression methods. These methods can be categorized into two types: one with loss (distortion) and the other being lossless(distortion-free). For example, the often seen formats such as PCX, GIF, TIFF, and TGA belong to the lossless image compression formats. They use the conventional file compression principles and technologies to process image compression. Therefore, there is no difference between the original image and the image restored from the compression result. As to the familiar joint photographic coding expert group (JPEG) belongs to the formats with loss. The above-mentioned image compression formats and methods often require the use of specific graphic software to read the original file before compressing and converting the data. This causes troubles to users.

In particular, for documents that are basically monochromatic and do not care so much about color distortion, how to automatically abandon some color information to reduce the image data size when reading in the original document is very important. This is particularly important for saving network transmission time and memory space.

SUMMARY OF THE INVENTION

In view of the foregoing, the invention provides a color image conversion method and the associated system that can reduce the image data size of monochromatic or grey-level documents processed by image input devices.

Normally, after an image input device scans a monochromatic or grey-level document, a color image File is generated. Due to noises in the machine or on papers, pure monochromatic or grey-level color (i.e. same RGB values) cannot be obtained all the time. In other words, the RGB values in the scanned data files or image file contain some errors. The invention sets a tolerable error range and converts the color image file into a monochromatic file (1 bit per pixel) or a grey-level image file (8 bits per pixel). Although there is some distortion in colors, the method is perfectly fine with BW or grey-level documents. If the RGB values in the color image file exceed the tolerable error range, the document is considered as a color document and thus not processed. In this manner, the invention can automatically determine whether the document content is purely monochromatic or grey-level. From this, the invention further determines whether to convert the file into a 1 bit/pixel monochromatic image file or an 8 bits/pixel grey-level image file. It does not require the user to determine whether the document is a color one or a BW one. At the same time, the data sizes of monochromatic or grey-level documents can be reduced.

To achieve the above objective, the disclosed color image conversion method contains the steps of: setting a tolerable error range for pixels; reading a source document to produce an original color image file; checking whether the pixel values of the original color image file fall within the predetermined tolerable error range for pixels; converting the original color image file into a colorless image file to reduce the data size and storing it. In particular, the colorless image file can be set as a monochromatic or grey-level image, depending upon the predetermined pixel tolerable error range. If the pixel values of the original color image file fall outside the predetermined pixel tolerable error range, the source document is considered as a color document without processing it.

Using the disclosed method and the associated system, a monochromatic or grey-level document is read into the image input device and recorded in the 8-bit or even 1-bit format, reducing the storage spaced occupied by the image file.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The color image conversion method and system disclosed in the invention can automatically convert a monochromatic or grey-level document read in by an image input device into one in 1-bit or 8-bit format. This helps the network transmission time and storage space of image files.

This mechanism is particularly useful for image input devices (such as scanners and digital cameras). After the image file is converted into a 1-bit or 8-bit file, it can be further compressed to reduce its size. This is convenient for office uses because most documents are simply texts and there is no need to store and display them in colors.

Figure 1:
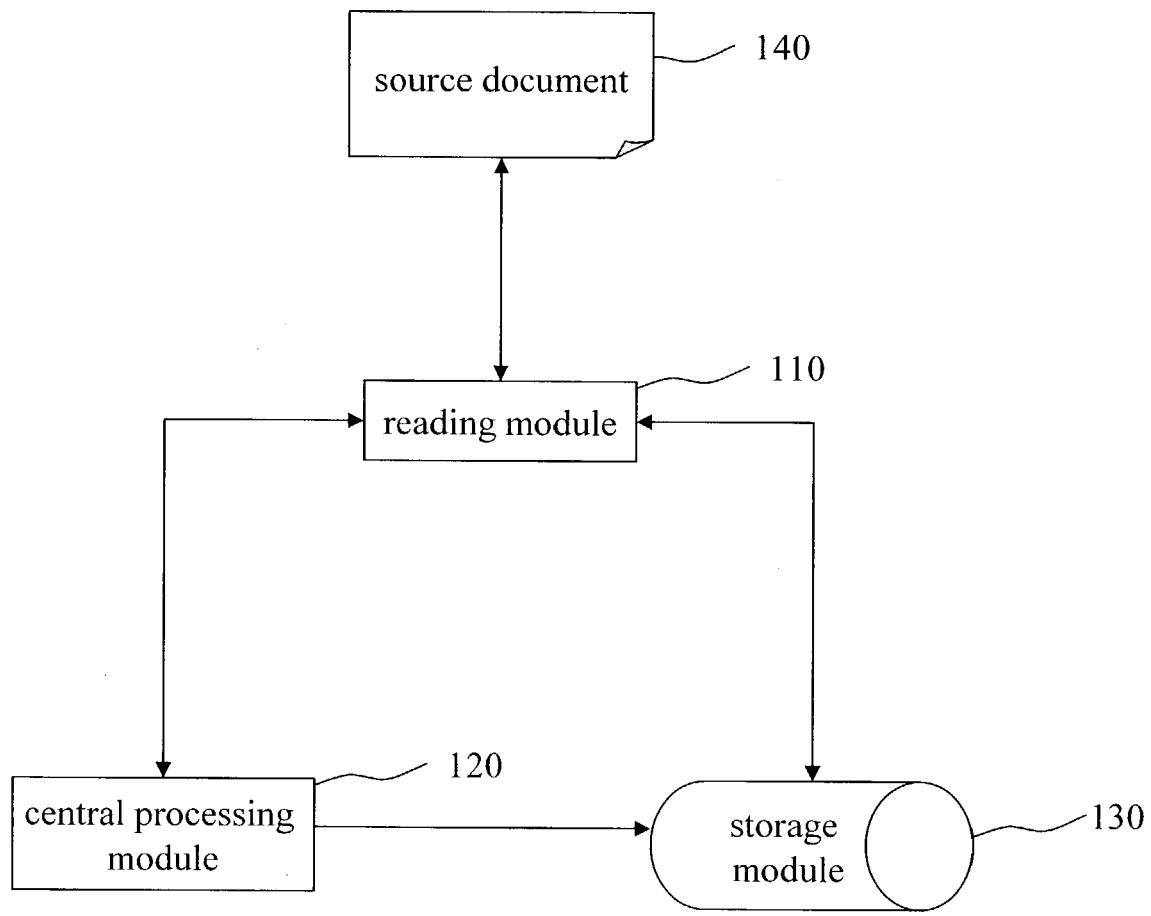
FIG. 1 is a schematic view of the disclosed color image conversion system.

Implementing the disclosed method requires the use of an appropriate color image conversion system. The rapid image conversion system of the invention contains: a reading module 110, a central processing module 120, and a storage module 130. As shown in FIG. 1, the reading module 110 reads in a source document 140 to generate an original color image file. The central processing module 120 analyzes the pixel information of the original color image file and converts the original color image file into a non-color image file. The storage module 130 stores the non-color image file processed by the central processing module 120.

Figure 2:
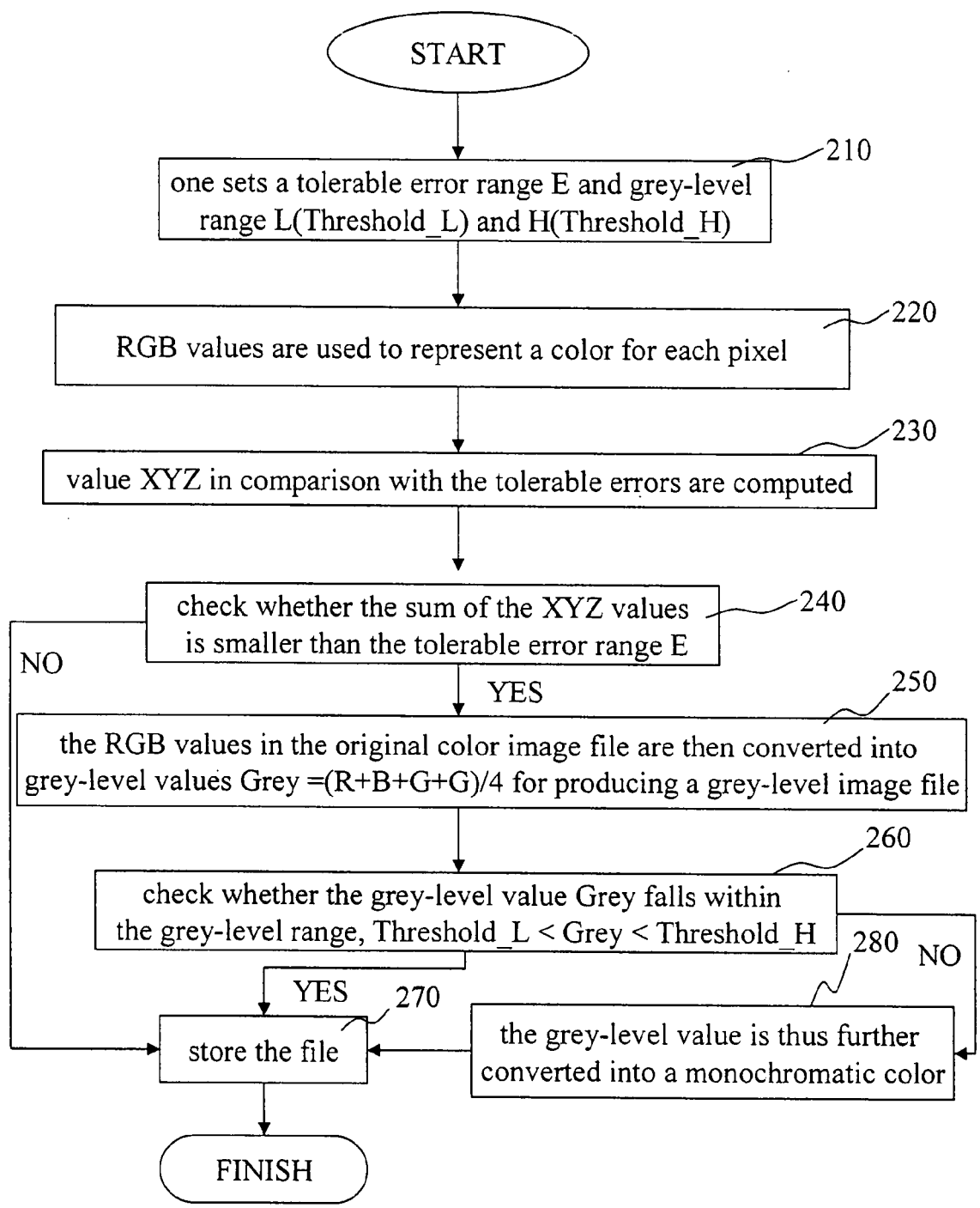
FIG. 2 is a flowchart of the disclosed color image conversion method.

FIG. 2 shows the detailed steps of the disclosed color image conversion method according to the invention. First, one sets a tolerable error range B and grey-level range L(Threshold_L) and H(Threshold_H) (step 210). A source document is read in to generate an original color image file. RGB values are used to represent a color for each pixel (step 220). Value XYZ in comparison with the tolerable errors are computed (step 230), X=abs(R−G), Y=abs(G−B) and Z=abs(B−R). Check whether the sum of the XYZ values is smaller than the tolerable error range F (step 240) to make sure that the pixel values of the original color image file fall within the predetermined tolerable error range for pixels. The RGB values in the original color image file are then converted into grey-level values Grey=(R+B+G+G)/4 for producing a grey-level image file (step 250). The system further checks whether the grey-level value Grey falls within the grey-level range, Threshold_L<Grey<Threshold_H (step 260). If all grey-level values Grey of the pixels are smaller than Threshold$_{13}$ H and greater than Threshold_L the system considers this image file as a grey-level image file with 8 bits/pixel. Finally, store the file (step 270).

If the pixel values in the original color image file are determined to fall outside the predetermined tolerable error range for pixels, the source document is considered as non-monochromatic or non-grey-level document without going through subsequent steps 250 and 260. The original color image file is directly stored. In step 260, if the grey-level values Grey of all pixels are greater than Threshold_H and or smaller than Threshold_L the image file is viewed as a monochromatic image file (1 bit/pixel). The grey-level value is thus further converted into a monochromatic color (step 280). The value Grey is set to 0 and 1 when it is greater and smaller than Threshold H, respectively. Afterwards, step 270 is performed to store the file.

Certain variations would be apparent to those skilled in the art, which variations are considered within the spirit and scope of the claimed invention.

What is claimed is:

1. A color image conversion method for reducing the image data size of a monochrome document scanned by a image input device, comprising the steps of:
   setting a tolerable error range for pixels;
   reading a source document to generate an original color image file;
   checking whether the pixel values derived from the original color image file fall within the tolerable error range;
   converting the original color image file into a monochrome image file to reduce the data, if all of the pixel values derived from the original color image file fall within the tolerable error range; and
   storing the converted file.

2. The method of claim 1, wherein the original color image file is a 24-bit image file.

3. The method of claim 1, wherein the monochrome image file is a 1-bit monochromatic image file.

4. The method of claim 1, wherein the monochrome image file is an 8-bit grey-level image file.

5. The method of claim 1, wherein the original color image file is stored when its pixel values are determined to fall outside the tolerable error range.

6. The method of claim 1, wherein the step of converting the original color image file into a monochrome image file to reduce the data is followed by the step of checking whether the monochrome image file is a grey-level image file.

7. The method of claim 6, wherein the image file is stored as a black-and-white image file when it is determined not to be a grey-level image file.

8. The method of claim 1, wherein the image, input device detects red, green, and blue values for each pixel, and further comprising the step of combining color values for each pixel before conducting the checking step.

9. A color image conversion system for reducing the image data size of a monochrome scanned document, comprising:
   a reading module, which scans the document to generate an original color image file;
   a central processing module, which analyzes the pixel information in the original color image file and converts the original color image file into a monochrome image file, the analysis including determining whether pixel values derived from the original image file fall within a predetermined error range; and
   a storage module, which stores the monochrome image file converted by the central processing module.

10. The system of claim 9, wherein the original color image file is a 24-bit image file.

11. The system of claim 9, wherein the monochrome image file is a 1-bit monochromatic image file.

12. The system of claim 9, wherein the monochrome image file is an 8-bit grey-level image file.

* * * * *